United States Patent
Belgardt et al.

(10) Patent No.: US 6,691,243 B1
(45) Date of Patent: Feb. 10, 2004

(54) METHOD AND CONFIGURATION FOR REPLACING A FAULTY MODULE, PARTICULARLY A FAULTY MODULE WITHIN A DIGITAL EXCHANGE INSTALLATION

(75) Inventors: Eckhardt Belgardt, München (DE); Hans Bittermann, Neuried (DE); Jörg Köpp, München (DE); Klaus Steinigke, München (DE)

(73) Assignee: Siemens Aktiengesellschaft, Munich (DE)

( * ) Notice: Subject to any disclaimer, the term of this patent is extended or adjusted under 35 U.S.C. 154(b) by 557 days.

(21) Appl. No.: 09/637,591

(22) Filed: Aug. 14, 2000

Related U.S. Application Data

(63) Continuation of application No. PCT/DE99/00398, filed on Feb. 11, 1999.

(30) Foreign Application Priority Data

Feb. 12, 1998 (DE) ................................ 198 05 711

(51) Int. Cl.[7] .................................................. G06F 11/00
(52) U.S. Cl. ............................ 714/3; 714/46; 361/679
(58) Field of Search ............................ 714/3, 44, 56, 714/57, 46; 361/679; 324/556

(56) References Cited

U.S. PATENT DOCUMENTS

| | | | |
|---|---|---|---|
| 3,573,558 A | | 4/1971 | Babcock |
| 3,997,879 A | * | 12/1976 | Markley et al. ............... 714/24 |
| 4,885,683 A | * | 12/1989 | Coogan ....................... 714/36 |
| 5,513,312 A | | 4/1996 | Löbig |
| 5,664,119 A | * | 9/1997 | Jeffries et al. .............. 710/302 |
| 5,884,264 A | * | 3/1999 | Ortiz ......................... 704/270 |
| 5,892,928 A | * | 4/1999 | Wallach et al. ............. 710/302 |
| 6,058,454 A | * | 5/2000 | Gerlach et al. ............. 711/114 |
| 6,067,506 A | * | 5/2000 | Goldys et al. .............. 702/117 |
| 6,122,756 A | * | 9/2000 | Baxter et al. ................ 714/30 |

OTHER PUBLICATIONS

"Maintaining the Dimension 400 PBX" (Braun), dated 1976, Bell Laboratories Record, pp. 244–248.

* cited by examiner

Primary Examiner—Robert Beausoliel
Assistant Examiner—Yolanda L Wilson
(74) Attorney, Agent, or Firm—Laurence A Greenberg; Werner H. Stemer; Ralph E. Locher

(57) ABSTRACT

Different conditions of a module are indicated by means of at least one visual indicator element, for instance in the form of a light emitting diode, mounted visibly on the module. Pressing a repair key initiates a repair condition, in which the actions and control procedures necessary for taking the faulty module out of service are carried out, and also causes a newly inserted module in a module frame to be automatically recognized, prompts a test function and causes the new module to be automatically put into service upon passing a test procedure.

12 Claims, 2 Drawing Sheets

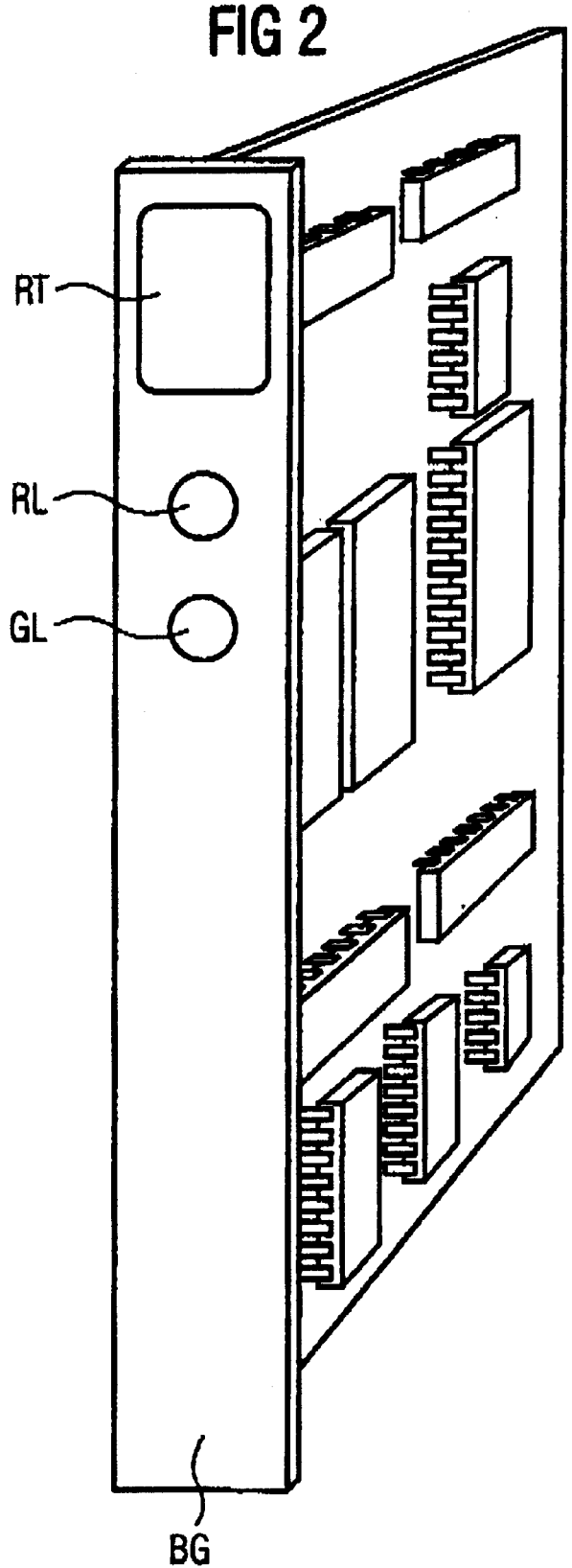

METHOD AND CONFIGURATION FOR REPLACING A FAULTY MODULE, PARTICULARLY A FAULTY MODULE WITHIN A DIGITAL EXCHANGE INSTALLATION

CROSS-REFERENCE TO RELATED APPLICATION

This is a continuation of international application PCT/DE99/00398, filed Feb. 11, 1999, which designated the United States.

BACKGROUND OF THE INVENTION

Field of the Invention

The invention relates to a method and to an configuration for replacing a faulty module situated in a module frame, preferably in a digital exchange installation. The faulty condition of the module (BG) is indicated, on the basis of the extent of its effect, by means of at least one visual indicator element which is mounted visibly on the module. Once the module has been taken out of service, one or more visual indicator elements indicate the out-of-service condition. After a new module has been inserted, instead of the faulty module, into the slot intended for it in the module frame, the test-function performance condition and the new module's subsequent in-service condition is indicated, as appropriate.

Such a method for replacing a faulty module, for example of the so-called "LTG" type, situated in a module frame in a rack frame within an exchange installation is described in a maintenance manual, also intended for customers, entitled "Wartung Zugangstechnik MMN:LTGM [Maintenance Access Technology MMN:LTGM]" by Siemens AG of Germany, published in 1996 by the Bereich Öffentliche Kommunikationsnetze [Public Communication Network Sector], Hofmannstr. 51, D-81359 Munich, Germany, with the index number A30808-X3078-A465-1-20.

According to the manual, in the event of a fault arising in a module, or even total failure of the module, the procedure is based on the method steps below, which are also known, among others, from commonly assigned U.S. Pat. No. 5,513,312, entitled "Method For System-Prompted Fault Clearance Of Equipment In Communcation Systems" (see German published patent application DE 42 42 323 A1).

Commands for locating the faulty module, possibly for interrupting the connections existing on the module and for taking the faulty module out of service are entered manually by a maintenance engineer on a control terminal for maintaining, monitoring and controlling the exchange installation. On the basis of the address indicated on the control terminal for the slot containing the faulty module, a maintenance engineer looks for the appropriate slot and replaces the faulty module. After that, the module newly inserted into the slot is tested and put into service using manual entries on a control terminal, which may be another control terminal.

Such a method for replacing faulty modules is disadvantageous in many respects because, as explained below, it is time-consuming and very susceptible to error.

A maintenance engineer needs to find and replace the module indicated as being faulty on a control terminal among a multiplicity of modules, normally up to 25 modules in a compact row in a module frame. A rack frame usually contains four module frames.

In view of the fact that a digital exchange installation of average size contains approximately 10,000 modules each having an MTBF (mean time between failures) of 10–20 years, it is possible that over 500 repairs need to be carried out annually for each exchange installation in the very complicated manner described above.

SUMMARY OF THE INVENTION

It is accordingly an object of the invention to provide a method and a configuration for exchanging a faulty component module, which overcomes the above-mentioned disadvantages of the heretofore-known devices and methods of this general type and which provides for a method of replacing a faulty module which is as simple as possible and at the same time easy to use.

With the foregoing and other objects in view there is provided, in accordance with the invention, an improved method of replacing a faulty module in a module frame, wherein:

a faulty condition of the module in the module frame is indicated in accordance with an extent of an effect of the faulty condition, with at least one visual indicator element mounted visibly on the module;

an out-of-service condition is indicated with one or more of the visual indicator elements once the module has been taken out of service; and after a new module has been inserted in place of the faulty module in the module frame, a test-function performance condition and the subsequent in-service condition of the new module are indicated, as appropriate.

The improved method comprises:

pressing a repair key assigned to the module for initiating a repair condition, whereby actions and control procedures required for taking the faulty module out of service are carried out, and for causing the new module inserted in the module frame to be automatically recognized, and for initiating a test function and an automatic placement into service of the new module in dependence on a positive test result obtained in the test function.

In other words, pressing a repair key assigned to the faulty module initiates a repair condition. During the repair condition, the actions and control procedures required for taking the faulty module out of service are prompted, and also automatic recognition of a newly inserted module in the module frame is made possible. Once a new module has been recognized, if appropriate, a test function is carried out and the new module is automatically put into service on the basis of the positive test result.

This procedure is therefore a particularly advantageous solution because, during the repair condition, there is no need for any manual entry of commands on a control terminal in order to take the faulty module out of service, to carry out a test function and to put the new module into service.

This means that the inventive method for replacing a faulty module is identical for all types of modules in a digital exchange installation.

Furthermore, a maintenance engineer can replace a faulty module unaided by instructions from a further maintenance engineer situated in a maintenance center, which is usually in a different location than the exchange installation.

In accordance with an added feature of the invention, alarm and fault messages that are conventionally prompted when the faulty module is removed from the module frame are suppressed during the repair condition, and the repair condition is limited to a predetermined period of time. Suppressing the alarm and fault messages avoids any reactions from being prompted which are uncalled for in this condition. For safety reasons, the repair condition is limited to a particular period of time.

In accordance with an additional feature of the invention, the module and the module frame form a part of a digital exchange installation, and the method further comprises configuring necessary actions and control procedures for taking the faulty module out of service such that, during the repair condition, no new connections are set up and existing connections are maintained. The existing connections may be maintained for their entire duration or they may by limited to a specified period of time.

With the above and other objects in view there is also provided, in accordance with the invention, a configuration for carrying out the above-outlined method. In the novel configuration at least one visual indicator element is visibly mounted on the module, and the repair key is individually assigned to each module, for instance individually mounted on the module, or it is functionally assigned to a respective plurality of the modules. In the latter case, the repair key may be mounted on a module frame containing one or more modules.

At least one visual indicator element, e.g. a light emitting diode, is mounted visibly on the module in order to indicate the different conditions of the module. In addition, a repair key is mounted on the module. This is either provided for individual modules or is assigned to a respective plurality of modules. Furthermore, the repair key can be mounted on a module frame containing one or more modules, rather than on a module. In this case, the repair key is assigned to a respective plurality of modules.

Other features which are considered as characteristic for the invention are set forth in the appended claims.

Although the invention is illustrated and described herein as embodied in a method and configuration for replacing a faulty module, preferably within a digital exchange installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a perspective view of an embodiment of a module situated inside a module frame in a rack frame.

DESCRIPTION OF THE PREFERRED EMBODIMENTS

Figure 1:
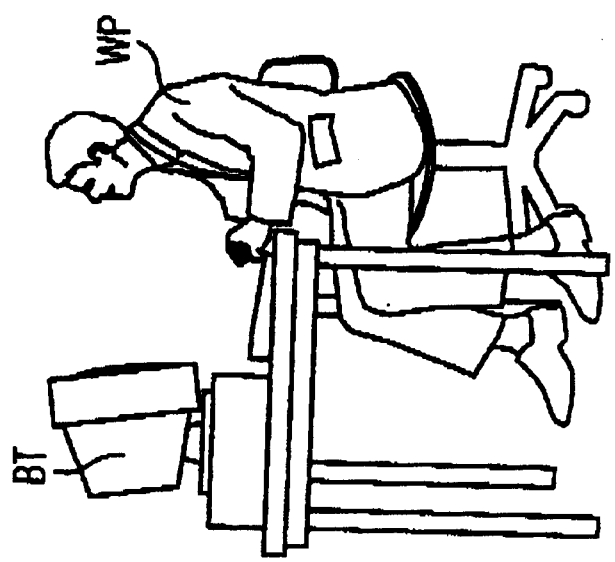
FIG. 1 is a diagrammatic perspective view of a control terminal, which can be operated by a maintenance engineer, and a rack row having three rack frames arranged next to one another within a digital exchange installation.
Figure 1:
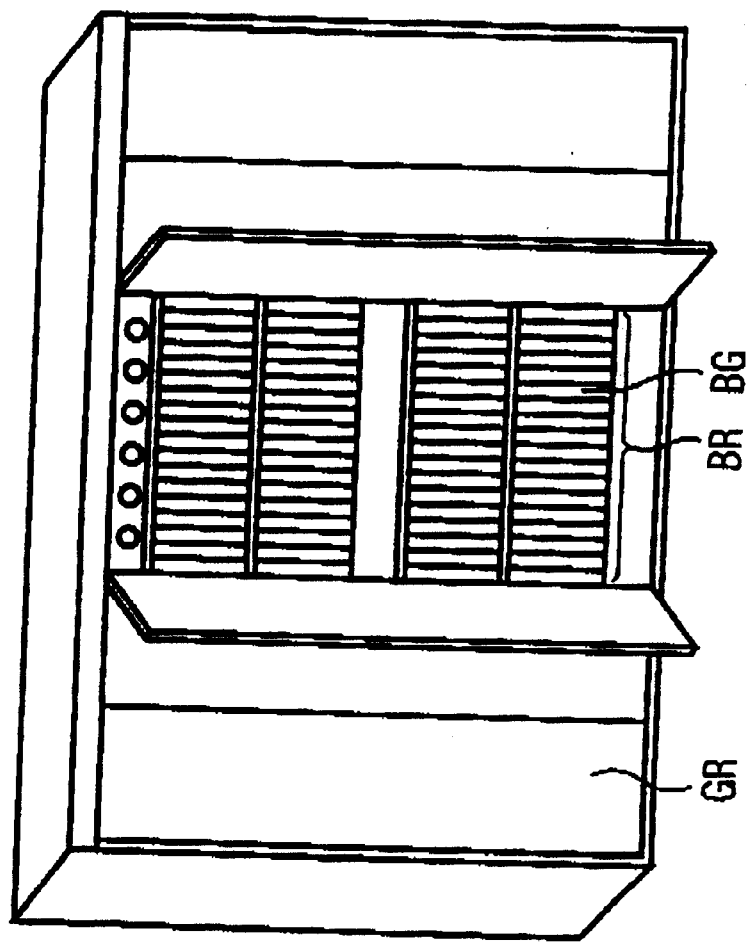

Referring now to the figures of the drawing in detail and first, particularly, to FIG. 1 thereof, there is seen a maintenance engineer WP, in a maintenance center, currently operating a control terminal BT. Shown beside the maintenance engineer WP is a rack row having three rack frames GR arranged next to one another, that is to say part of a digital exchange installation usually in a different location than the maintenance center. The physical separation of the exchange installation from the maintenance center is indicated by a dashed line. The interior of the middle rack frame shows four module frames BR which are arranged one above the other and contain a plurality of modules or assemblies BG.

Referring now to FIG. 2, there is shown a module BG which has a repair key RT for the individual module, a red light emitting diode RL and a green light emitting diode GL mounted on its front panel.

If a module in a module frame either has a fault or has failed entirely, a message is indicated on the screen of the control terminal BT in the maintenance center. By way of example, the message on the screen of the control terminal specifies the type of module, the cause of the fault, the fault or alarm condition and the address of the faulty module in the module frame within a rack frame in a particular rack row.

In addition to the message on the screen of the control terminal, the condition of the module is indicated to a maintenance engineer in situ by means of, for example, the two light emitting diodes RL and GL situated on the front panel of the module. If the module is in a fault-free condition, the red light emitting diode is off and the green light emitting diode is on. If the module is faulty but is still in operation, then both the red light emitting diode RL and the green light emitting diode GL are on. In the event of total failure of the module, only the red light emitting diode RL is lit. In the event of the power supply failing, both light emitting diodes are off.

Once the faulty module has been found, the maintenance engineer presses the repair key, which is preferably mounted on the front panel of the module, in order to initiate a repair condition, for example lasting 15 minutes. During the repair condition, alarm and fault messages usually prompted as a result of the faulty module being removed from the module frame are suppressed in order to prevent uncalled-for reactions prompted by them.

In the event of total failure of the module, the maintenance engineer can remove the failed module from its slot and replace it with a new module.

For the other case, where the module is faulty but is still in operation, no new connections are permitted for this module and existing connections are terminated, for example no later than after 2 minutes. While connections still exist, the red light emitting diode is lit and the green light emitting diode flashes. When there are no more existing connections for the module, i.e. it is out of service, the red light emitting diode is lit and the green light emitting diode is off. In this condition, indicated by the light emitting diodes, the faulty module can be replaced with a new one.

If, in the case of pairs of redundant modules, one module is faulty and the other module has failed, that is to say both modules need to be replaced, the repair condition is initiated for the failed module first and this module is replaced with a new module. The faulty module is then replaced after the repair condition has been initiated once more.

Once the new module has been inserted into the slot intended for it, a test function is automatically carried out and the new module is put into service on the basis of the positive test result. While this test function is being carried out and the new module is being put into service, the red light emitting diode is lit and the green light emitting diode flashes. If it has been possible to put the new module into service successfully, the red light emitting diode is off and the green light emitting diode is on. The faulty module has thus been successfully replaced.

If the test result for the new module is negative or it has not been possible to place the module into service successfully, the new module remains out of service. This condition of the module is indicated by the red light emitting diode being lit and the green light emitting diode being off. It is therefore necessary to make a second attempt at replacing the module.

A second attempt at replacing a faulty module may also be necessary if, once the repair key has been pressed, it has not been possible to replace the module within the period of time for the repair condition. When the period of time of, say, 15 minutes has elapsed, the repair condition is ended by the attempt to put the module into service again irrespective of its condition.

We claim:

1. In a method of replacing a faulty module in a module frame for a digital branch exchange, wherein:
    a faulty condition of the module in the module frame is indicated in accordance with an extent of an effect of the faulty condition, with at least one visual indicator element mounted visibly on the module;
    an out-of service condition is indicated with one or more of the visual indicator elements once the module has been taken out of service; and
    after a new module has been inserted in place of the faulty module in the module frame, a test-function performance condition and the subsequent in-service condition of the new module are indicated, as appropriate;
    the method comprising the steps of:
        pressing a repair key assigned to the module of the digital branch exchange for initiating a repair condition, wherein actions and control procedures required for taking the faulty module out of service are carried out, and for causing the new module inserted in the module frame to be automatically recognized; and
        for initiating a test function and an automatic placement into service of the new module in dependence on a positive test result obtained in the test function.

2. The method according to claim 1, which comprises suppressing alarm and fault messages conventionally prompted when the faulty module is removed from the module frame during the repair condition, and limiting the repair condition to a predetermined period of time.

3. The method according to claim 1, wherein the module and the module frame form a part of a digital exchange installation, and the method further comprises configuring necessary actions and control procedures for taking the faulty module out of service such that, during the repair condition, no new connections are set up and existing connections are maintained.

4. The method according to claim 3, wherein the existing connections are maintained for their entire duration.

5. The method according to claim 3, wherein the existing connections are maintained for a limited period of time.

6. The method according to claim 1, further comprising the step of assigning a function of the repair key to a respective plurality of the modules.

7. The method according to claim 1, further comprising the step of mounting the repair key on a module frame containing one or more modules.

8. An apparatus for of replacing a faulty module in a module frame for a digital branch exchange, wherein:
    a faulty condition of the module in the module frame is indicated in accordance with an extent of an effect of the faulty condition, with at least one visual indicator element mounted visibly on the module;
    an out-of service condition is indicated with one or more of the visual indicator elements once the module has been taken out of service; and
    after a new module has been inserted in place of the faulty module in the module frame, a test-function performance condition and the subsequent in-service condition of the new module are indicated, as appropriate;
    the apparatus comprising:
        a repair key assigned to the module of the digital branch exchange for initiating a repair condition, wherein actions and control procedures required for taking the faulty module out of service are carried out, and for causing the new module inserted in the module frame to be automatically recognized, and
        for initiating a test function and an automatic placement into service of the new module in dependence on a positive test result obtained in the test function.

9. The apparatus according to claim 8, wherein the repair key is individually assigned to each module.

10. The apparatus according to claim 8, wherein the repair key is individually mounted on the module.

11. The apparatus according to claim 8, wherein the repair key is functionally assigned to a respective plurality of the modules.

12. The apparatus according to claim 6, wherein the repair key is mounted on a module frame containing one or more modules.

\* \* \* \* \*